(12) United States Patent
Jin et al.

(10) Patent No.: US 7,697,950 B2
(45) Date of Patent: *Apr. 13, 2010

(54) METHODS AND APPARATUS FOR THE IMMEDIATE ACCEPTANCE AND QUEUING OF VOICE DATA FOR PTT COMMUNICATIONS

(75) Inventors: Xin Jin, Ottawa (CA); Wen Zhao, Kanata (CA)

(73) Assignee: Research in Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 11/866,715

(22) Filed: Oct. 3, 2007

(65) Prior Publication Data

US 2008/0020718 A1    Jan. 24, 2008

Related U.S. Application Data

(63) Continuation of application No. 10/880,716, filed on Jun. 30, 2004, now Pat. No. 7,295,853.

(51) Int. Cl.
*H04B 7/00* (2006.01)
*H04Q 7/20* (2006.01)

(52) U.S. Cl. .................. 455/518; 455/520; 455/517; 455/90.2

(58) Field of Classification Search .................. 455/518, 455/517, 90.2, 519, 509, 520, 452.1, 450, 455/550.1, 557, 552.1, 514, 463; 370/310, 370/352, 401, 390
See application file for complete search history.

(56) References Cited

U.S. PATENT DOCUMENTS 6,516,200 B1    2/2003    Schmidt et al.

7,295,853 B2 *  11/2007   Jin et al. .................... 455/518
2002/0173326 A1 * 11/2002  Rosen et al. ................ 455/518

(Continued)

FOREIGN PATENT DOCUMENTS

WO    03100372 A1    12/2003

OTHER PUBLICATIONS

European Search Report for EP patent application 04253939.5, Nov. 19, 2004.

*Primary Examiner*—John Lee
(74) *Attorney, Agent, or Firm*—John J. Oskorep, Esq.

(57) ABSTRACT

In one illustrative example, a mobile station includes a wireless transceiver; a user interface including a Push-To-Talk (PTT) switch for initiating a PTT voice communication and a microphone for receiving voice input signals; one or more processors; and a First-In-First-Out (FIFO) buffer memory coupled to the one or more processors. The one or more processors are operative to identify a user actuation of the PTT switch and, in response, save digital voice data corresponding to voice input signals in the FIFO buffer memory; cause a request for the PTT voice communication to be made through a wireless network; identify that a floor grant has been received through the wireless network in response to the request; and after identifying the floor grant, cause the digital voice data from the FIFO buffer memory to be retrieved and transmitted to the wireless network for the PTT voice communication. Advantageously, the saving of the digital voice data in the FIFO buffer memory is performed at least in part during a delay time period between the user actuation of the PTT switch and the identifying of the floor grant.

8 Claims, 6 Drawing Sheets

U.S. PATENT DOCUMENTS

2005/0122923 A1  6/2005  Jang et al.
2005/0164681 A1* 7/2005  Jenkins et al. ............ 455/412.1
2005/0203998 A1* 9/2005  Kinnunen et al. ............ 455/518
2005/0227657 A1* 10/2005 Frankkila et al. ............ 455/255
2006/0178138 A1  8/2006  Ostroff et al.

* cited by examiner

300

METHODS AND APPARATUS FOR THE IMMEDIATE ACCEPTANCE AND QUEUING OF VOICE DATA FOR PTT COMMUNICATIONS

CROSS-REFERENCE TO RELATED APPLICATION

The present application is a continuation of and claims priority to a U.S. Non-Provisional Patent Application Ser. No. 10/880,716 having a filing date of 30 Jun. 2004 now U.S. Pat. No. 7,295,853 and entitled "Methods And Apparatus For The Immediate Acceptance And Queuing Of Voice Data For PTT Communications," which is hereby incorporated reference herein.

BACKGROUND

1. Field of the Invention

The present invention relates generally to Push-To-Talk (PTT) voice communications, and more particularly to methods and apparatus for the immediate acceptance and queuing of voice data for PTT voice communications.

2. Description of the Related Art

A wireless communication device, such as a cellular telephone or mobile station, is capable of making and receiving voice calls and/or sending and receiving data over a wireless communication network. Recent developments have given such mobile stations the ability to communicate in "push-to-talk" (PTT) modes using Push-to-talk over Cellular (PoC) technology. PoC communication utilizes Voice-over-IP (VoIP) techniques which involve the communication of data packets carrying voice information. PoC communication is adapted for one-to-one talks or group talks which are session-based. The end user of a mobile station may send an "invitation" for PoC communication to other potential "participants" who may "accept" or ignore the invitation. When an initiation is accepted, a PoC session is created between the two participants. Further acceptances of the invitation may expand the session into a group session having more than two participants.

In such networks, when the PTT switch is pressed at the mobile station, the end user is not able to immediately speak into the microphone. The end user must wait for some time delay period after the PTT switch depression in order to speak. This time delay period may be caused by PTT setup and channel setup activities. This delay is an inconvenience for end users in PTT communications, who may have to wait up to around eight seconds in some cases to talk after depressing the PTT switch.

In proposed Global System for Mobile communications (GSM) standards, buffering in the network is suggested to work-around the connection delay while the base station is paging the other party (or parties). However, no such technique is described for the handset to allow the origination party to talk immediately after PTT switch actuation. The following is text from the GSM standard that addresses the issue between the base station and a "user B", which does not address the issue between a "user A" and the base station:

If the PoC server is configured to use the optional early media procedures, it will answer the INVITE with a 202 (Accepted) response. This response together with the "floor grant" message from the talker arbitration process informs user A that user B has not been reached yet, but that the PoC server is already prepared to receive media. The PoC server will buffer all the media received from user A until it can be delivered to user B. When user B is finally contacted, the PoC server informs user A about this using a NOTIFY request.

A network support early media establishment shall be prepared to receive media prior to any invited user answers and shall buffer received media until at least the first invited user accepts the invitation. The buffered media should be sent to all users that accept the invitation. The media establish mode to operate is implementation dependent, however, the PoC server may use e.g. a pre-configured network parameter, a property of the user of a property of the group. The amount of the media that the network may buffer until the first invited user accepts the invitation is a network option.

Again, these techniques relate to buffering in the network and do not address the time delay between PTT switch actuation and the time to begin talking. Note there is a gap in this technique even for some of the user B's communications. The network only buffers media until the first user B is accepted, and the buffered media are sent to all users that accepted. Thus, some middle portion of the voice data may be missed for users 2 to N.

Accordingly, there is a resulting need for mobile station methods and apparatus for facilitating PTT voice communications that overcome the deficiencies of the prior art.

SUMMARY

In one illustrative example of the present application, a mobile station includes a wireless transceiver; a user interface including a Push-To-Talk (PTT) switch for initiating a PTT voice communication and a microphone for receiving voice input signals; one or more processors; and a First-In-First-Out (FIFO) buffer memory coupled to the one or more processors. The one or more processors are operative to identify a user actuation of the PTT switch and, in response, save digital voice data corresponding to voice input signals in the FIFO buffer memory; cause a request for the PTT voice communication to be made through a wireless network; identify that a floor grant has been received through the wireless network in response to the request; and after identifying the floor grant, cause the digital voice data from the FIFO buffer memory to be transmitted to the wireless network for the PTT voice communication.

Advantageously, the saving of the digital voice data in the FIFO buffer memory is performed at least in part during a delay time period between the user actuation of the PTT switch and the identifying of the floor grant.

BRIEF DESCRIPTION OF THE DRAWINGS

Embodiments of present invention will now be described by way of example with reference to attached figures, wherein.

DETAILED DESCRIPTION OF THE PREFERRED EMBODIMENTS

In one illustrative example of the present application, a mobile station includes a wireless transceiver; a user interface including a Push-To-Talk (PTT) switch for initiating a PTT voice communication and a microphone for receiving voice input signals; one or more processors; and a First-In-First-Out (FIFO) buffer memory coupled to the one or more processors. The one or more processors are operative to identify a user actuation of the PTT switch and, in response: save digital voice data corresponding to voice input signals in the FIFO buffer memory; cause a request for the PTT voice communication to be made through a wireless network; identify that a floor grant has been received through the wireless network in response to the request; and after identifying the floor grant, cause the digital voice data from the FIFO buffer memory to be transmitted to the wireless network for the PTT voice communication.

Figure 1:
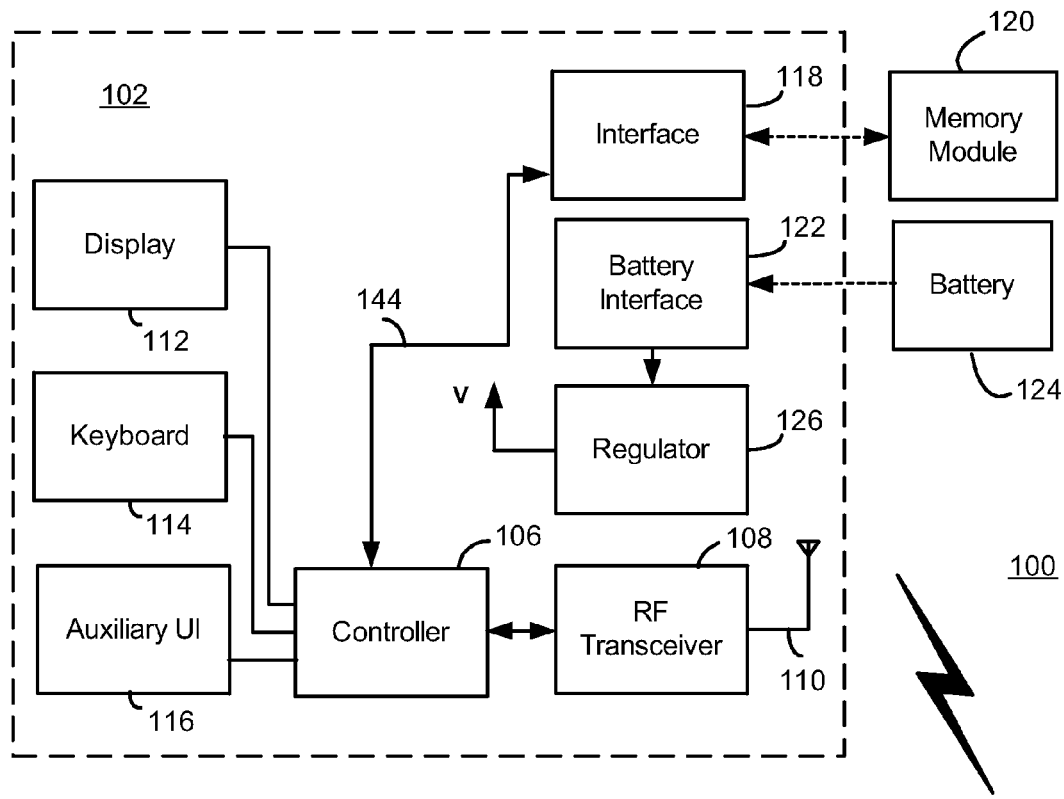
FIG. 1 is a block diagram which illustrates pertinent components of a mobile station and a wireless communication network.
Figure 1:
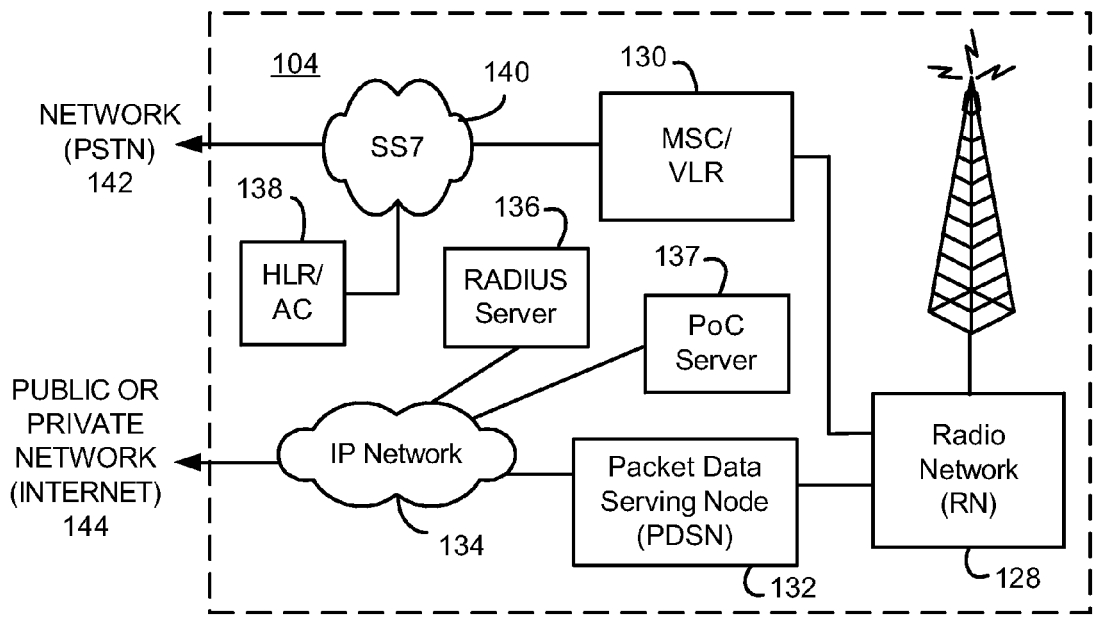

FIG. 1 is a block diagram of a communication system 100 which includes a mobile station 102 which communicates through a wireless communication network 104. Mobile station 102 preferably includes a visual display 112, a keyboard 114, and perhaps one or more auxiliary user interfaces (UI) 116, each of which is coupled to a controller 106. Controller 106 is also coupled to radio frequency (RF) transceiver circuitry 108 and an antenna 110.

Typically, controller 106 is embodied as a central processing unit (CPU) which runs operating system software in a memory component (not shown). Controller 106 will normally control overall operation of mobile station 102, whereas signal processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard, is normally provided for entering data for storage in mobile station 102, information for transmission to network 104, a telephone number to place a telephone call, commands to be executed on mobile station 102, and possibly other or different user inputs.

Mobile station 102 sends communication signals to and receives communication signals from network 104 over a wireless link via antenna 110. RF transceiver circuitry 108 performs functions similar to those of a radio network (RN) 128, including for example modulation/demodulation and possibly encoding/decoding and encryption/decryption. It is also contemplated that RF transceiver circuitry 108 may perform certain functions in addition to those performed by RN 128. It will be apparent to those skilled in art that RF transceiver circuitry 108 will be adapted to particular wireless network or networks in which mobile station 102 is intended to operate.

Mobile station 102 includes a battery interface 122 for receiving one or more rechargeable batteries 124. Battery 124 provides electrical power to electrical circuitry in mobile station 102, and battery interface 122 provides for a mechanical and electrical connection for battery 124. Battery interface 122 is coupled to a regulator 126 which regulates power to the device. When mobile station 102 is fully operational, an RF transmitter of RF transceiver circuitry 108 is typically turned on only when it is sending to network, and is otherwise turned off to conserve resources. Similarly, an RF receiver of RF transceiver circuitry 108 is typically periodically turned off to conserve power until it is needed to receive signals or information (if at all) during designated time periods.

Mobile station 102 operates using a memory module 120, such as a Subscriber Identity Module (SIM) or a Removable User Identity Module (R-UIM), which is connected to or inserted in mobile station 102 at an interface 118. As an alternative to a SIM or an R-UIM, mobile station 102 may operate based on configuration data programmed by a service provider into an internal memory which is a non-volatile memory. Mobile station 102 may consist of a single unit, such as a data communication device, a cellular telephone, a multiple-function communication device with data and voice communication capabilities, a personal digital assistant (PDA) enabled for wireless communication, or a computer incorporating an internal modem. Alternatively, mobile station 102 may be a multiple-module unit comprising a plurality of separate components, including but in no way limited to a computer or other device connected to a wireless modem. In particular, for example, in the mobile station block diagram of FIG. 1, RF transceiver circuitry 108 and antenna 110 may be implemented as a radio modem unit that may be inserted into a port on a laptop computer. In this case, the laptop computer would include display 112, keyboard 114, and one or more auxiliary UIs 116, and controller 106 may remain within the radio modem unit that communicates with the computer's CPU or be embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a mobile station 102 may have a more particular implementation as described later in relation to mobile station 202 of FIG. 2.

Mobile station 102 communicates in and through wireless communication network 104, which is preferably a cellular telecommunications network. In the embodiment of FIG. 1, wireless network 104 is a Third Generation (3G) supported network based on Code Division Multiple Access (CDMA) technologies. In particular, wireless network 104 is a CDMA2000 network which includes fixed network components coupled as shown in FIG. 1. Wireless network 104 of the CDMA2000-type includes a Radio Network (RN) 128, a Mobile Switching Center (MSC) 130, a Signaling System 7 (SS7) network 140, a Home Location Register/Authentication Center (HLR/AC) 138, a Packet Data Serving Node (PDSN) 132, an IP network 134, and a Remote Authentication Dial-In User Service (RADIUS) server 136. SS7 network 140 is communicatively coupled to a network 142 (such as a Public Switched Telephone Network or PSTN), whereas IP network is communicatively coupled to a network 144 (such as the Internet).

During operation, mobile station 102 communicates with RN 128 which performs functions such as call-setup, call processing, and mobility management. RN 128 includes a plurality of base station transceiver systems that provide wireless network coverage for a particular coverage area commonly referred to as a "cell". A given base station transceiver system of RN 128, such as the one shown in FIG. 1, transmits communication signals to and receives communication signals from mobile stations within its cell. The base station transceiver system normally performs such functions as modulation and possibly encoding and/or encryption of signals to be transmitted to the mobile station in accordance with particular, usually predetermined, communication protocols and parameters, under control of its controller. The base station transceiver system similarly demodulates and possibly decodes and decrypts, if necessary, any communication signals received from mobile station 102 within its cell. Communication protocols and parameters may vary between different networks. For example, one network may employ a different modulation scheme and operate at different frequencies than other networks. The underlying services may also differ based on its particular protocol revision.

The wireless link shown in communication system 100 of FIG. 1 represents one or more different channels, typically different radio frequency (RF) channels, and associated protocols used between wireless network 104 and mobile station 102. An RF channel is a limited resource that must be conserved, typically due to limits in overall bandwidth and a limited battery power of mobile station 102. Those skilled in art will appreciate that a wireless network in actual practice may include hundreds of cells depending upon desired overall expanse of network coverage. All pertinent components may be connected by multiple switches and routers (not shown), controlled by multiple network controllers.

For all mobile station's 102 registered with a network operator, permanent data (such as mobile station 102 user's profile) as well as temporary data (such as mobile station's 102 current location) are stored in a HLR/AC 138. In case of a voice call to mobile station 102, HLR/AC 138 is queried to determine the current location of mobile station 102. A Visitor Location Register (VLR) of MSC 130 is responsible for a group of location areas and stores the data of those mobile stations that are currently in its area of responsibility. This includes parts of the permanent mobile station data that have been transmitted from HLR/AC 138 to the VLR for faster access. However, the VLR of MSC 130 may also assign and store local data, such as temporary identifications. Mobile station 102 is also authenticated on system access by HLR/AC 138. In order to provide packet data services to mobile station 102 in a CDMA2000-based network, RN 128 communicates with PDSN 132. PDSN 132 provides access to the Internet 144 (or intranets, Wireless Application Protocol (WAP) servers, etc.) through IP network 134. PDSN 132 also provides foreign agent (FA) functionality in mobile IP networks as well as packet transport for virtual private networking. PDSN 132 has a range of IP addresses and performs IP address management, session maintenance, and optional caching. RADIUS server 136 is responsible for performing functions related to authentication, authorization, and accounting (AAA) of packet data services, and may be referred to as an AAA server.

Wireless communication network 104 also includes a Push-to-talk over Cellular (PoC) server 137 which may be coupled to IP network 134. PoC server 137 operates to facilitate PoC individual and group communication sessions between mobile stations within network 104. A conventional PoC communication session involves a session connection between end users of mobile stations, referred to as session "participants", who communicate one at a time in a half-duplex manner much like conventional walkie-talkies or two-way radios.

Those skilled in art will appreciate that wireless network 104 may be connected to other systems, possibly including other networks, not explicitly shown in FIG. 1. Although a CDMA network has been described as the environment, other suitable networks may be utilized, such as Global System for Mobile communications (GSM) and General Packet Radio Service (GPRS) network.

Figure 2:
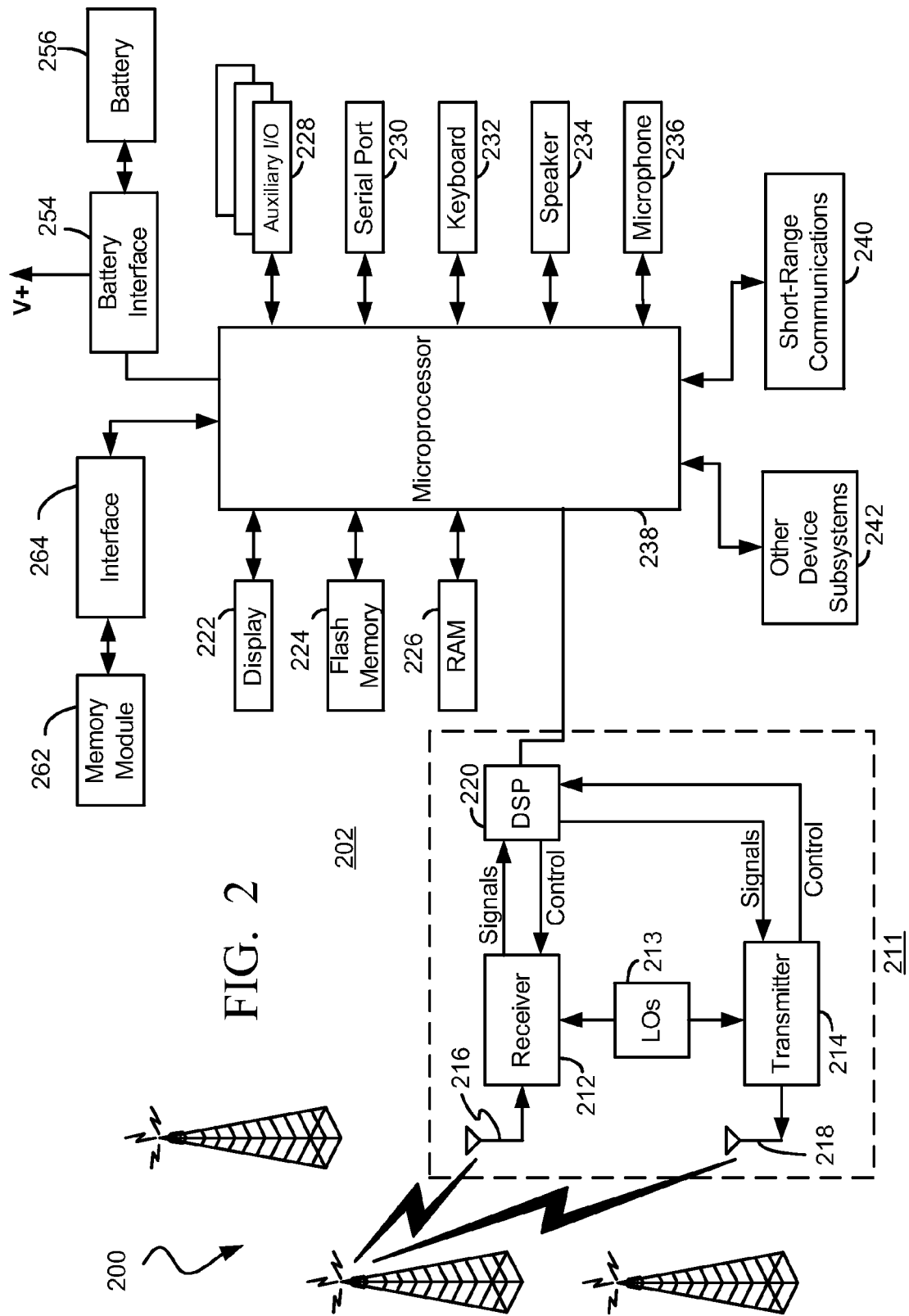
FIG. 2 is a more detailed diagram of a preferred mobile station of FIG. 1.

FIG. 2 is a detailed block diagram of a preferred mobile station 202. Mobile station 202 is preferably a two-way communication device having at least voice and advanced data communication capabilities, including the capability to communicate with other computer systems. Depending on the functionality provided by mobile station 202, it may be referred to as a data messaging device, a two-way pager, a cellular telephone with data messaging capabilities, a wireless Internet appliance, or a data communication device (with or without telephony capabilities). Mobile station 202 may communicate with any one of a plurality of base station transceiver systems 200 within its geographic coverage area. Mobile station 202 selects or helps select which one of base station transceiver systems 200 it will communicate with, as will be described in more detail later in relation to FIGS. 3 and 4.

Mobile station 202 will normally incorporate a communication subsystem 211, which includes a receiver 212, a transmitter 214, and associated components, such as one or more (preferably embedded or internal) antenna elements 216 and 218, local oscillators (LOs) 213, and a processing module such as a digital signal processor (DSP) 220. Communication subsystem 211 is analogous to RF transceiver circuitry 108 and antenna 110 shown in FIG. 1. As will be apparent to those skilled in field of communications, particular design of communication subsystem 211 depends on the communication network in which mobile station 202 is intended to operate.

Mobile station 202 may send and receive communication signals over the network after required network registration or activation procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Network access is associated with a subscriber or user of mobile station 202, and therefore mobile station 202 requires a memory module 262, such as a Subscriber Identity Module or "SIM" card or a Removable User Identity Module (R-UIM), to be inserted in or connected to an interface 264 of mobile station 202 in order to operate in the network. Alternatively, memory module 262 may be a non-volatile memory which is programmed with configuration data by a service provider so that mobile station 202 may operate in the network. Since mobile station 202 is a mobile battery-powered device, it also includes a battery interface 254 for receiving one or more rechargeable batteries 256. Such a battery 256 provides electrical power to most if not all electrical circuitry in mobile station 202, and battery interface 254 provides for a mechanical and electrical connection for it. The battery interface 254 is coupled to a regulator (not shown in FIG. 2) which provides power V+ to all of the circuitry.

Mobile station 202 includes a microprocessor 238 (which is one implementation of controller 106 of FIG. 1) which controls overall operation of mobile station 202. This control includes network selection techniques of the present application. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 202. A predetermined set of applications which control basic device operations, including at least data and voice communication applications, will normally be installed on mobile station 202 during its manufacture. A preferred application that may be loaded onto mobile station 202 may be a personal information manager (PIM) application having the ability to organize and manage data items relating to user such as, but not limited to, e-mail, calendar events, voice mails, appointments, and task items. Naturally, one or more memory stores are available on mobile station 202 and SIM 256 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile station user's corresponding data items stored and/or associated with a host computer system thereby creating a mirrored host computer on mobile station 202 with respect to such items. This is especially advantageous where the host computer system is the mobile station user's office computer system. Additional applications may also be loaded onto mobile station 202 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile station 202 and may provide enhanced on-device functions, communication-related functions, or both. For example, secure communication applications may enable electronic commerce functions and other such financial transactions to be performed using mobile station 202.

In a data communication mode, a received signal such as a text message, an e-mail message, or web page download will be processed by communication subsystem 211 and input to microprocessor 238. Microprocessor 238 will preferably further process the signal for output to display 222 or alternatively to auxiliary I/O device 228. A user of mobile station 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication.

Short-range communications subsystem 240 of FIG. 2 is an additional optional component which provides for communication between mobile station 202 and different systems or devices, which need not necessarily be similar devices. For example, subsystem 240 may include an infrared device and associated circuits and components, or a Bluetooth™ communication module to provide for communication with similarly-enabled systems and devices. Bluetooth™ is a registered trademark of Bluetooth SIG, Inc.

Figure 3:
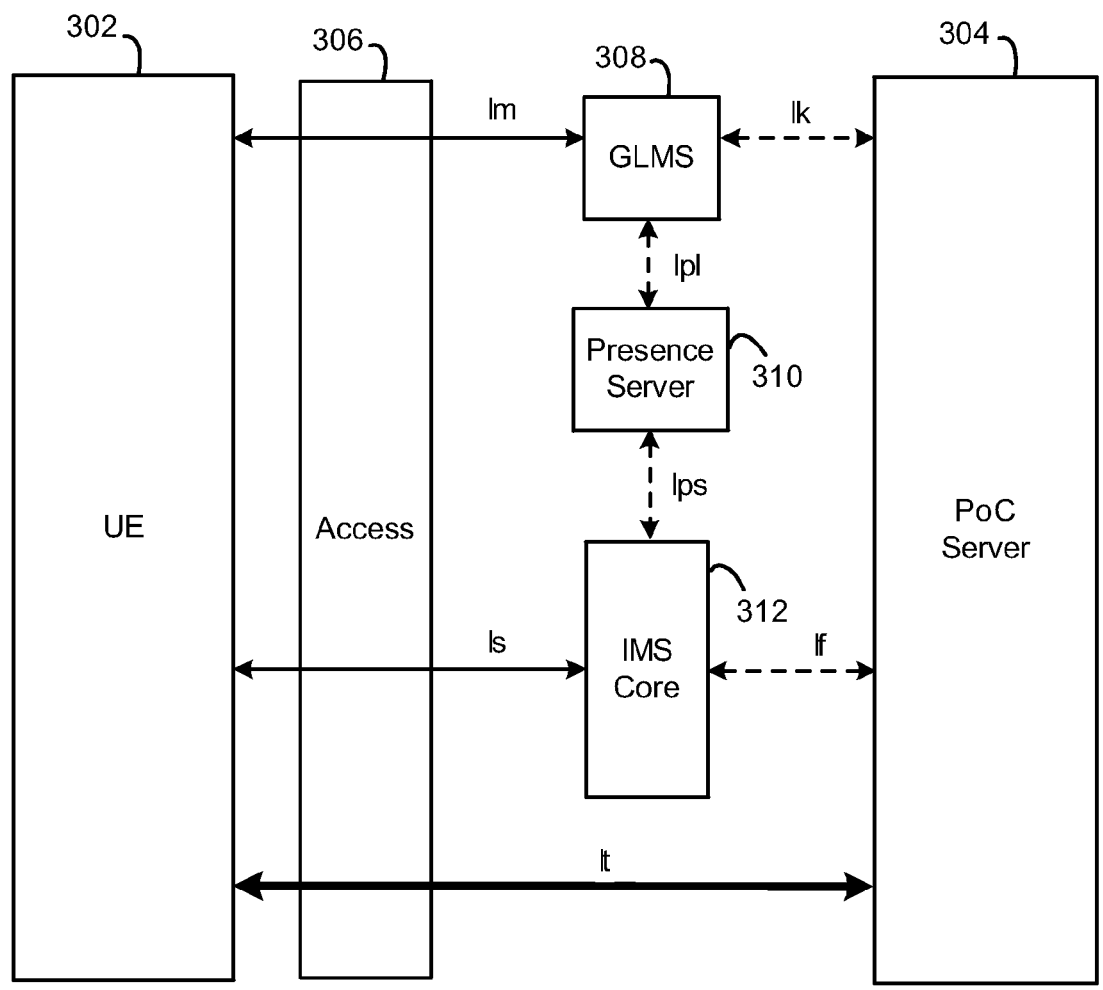
FIG. 3 is a block diagram of system components pertaining to PoC communication sessions.

FIG. 3 is a block diagram of relevant system components 300 pertaining to Push-to-talk over Cellular (PoC) communications, which may be utilized for the present techniques described herein. System components 300 include user equipment (UE) 302 which represents a mobile station, a Push-to-talk over Cellular (PoC) server 304, an access 306, a Group and List Management Server (GLMS) 308, an IP Multimedia Subsystem (IMS) core 312, and a presence server 310. Some of these components may be optional or not necessary for fundamental operation.

A PoC communication session is a session connection between end users of a UE 302, referred to as session "participants", who communicate one at a time in a half-duplex manner. PoC communication utilizes Voice over IP (VoIP) technology which involves the communication of data packets carrying voice information. UE 302 is terminal equipment (e.g. a mobile station) which includes PoC application client software, which includes functionality of the present application but otherwise utilizes conventional techniques. IMS core 312 includes a plurality of Session Initiation Protocol (SIP) proxies and SIP registrars. The first point of contact for UE 302 is one of the proxies in IMS core 312 that is configured on UE 302 as the outbound proxy. In the IMS architecture, the outbound proxy is known as the Proxy-CSCF (P-CSCF). IMS Core 312 performs the following functions: (1) routing of SIP signaling between UE 302 and PoC server 304; (2) termination of SIP compression from UE 302; (3) authentication and authorization; (4) maintenance of the registration state and the SIP session state; and (5) reporting to the charging system. UE 302 sends all its SIP messages to the IP address of the outbound proxy after resolving the SIP Uniform Resource Identifier (URI) of the outbound proxy to an IP address.

End users use GLMS 308 to manage groups, contact lists, and access lists. A contact list is a type of address book that may be used by end users to establish an instant talk session with other PoC users or PoC Groups. An end user may have one or several contact lists including identities of other PoC users or PoC groups. Contact list management includes operations to allow UE 302 to store and retrieve the contact lists located in GLMS 308. End users can define PoC groups. An end user may select one group from the list to initiate an instant group talk session or a chat group talk session, depending on the type of group. An access list is used by the end user as a means of controlling who is allowed to initiate instant talk sessions to the end user. An access list contains end user defined identities of other end users or groups. The end user may have one blocked identities list and one granted identities list.

PoC server 304 includes functionality to perform the PoC service. PoC Server 304 typically performs functions such as: (1) end-point for SIP signaling; (2) end-point for real-time transport protocol (RTP) and RTP Control Protocol (RTCP) signaling; (3) SIP session handling; (4) policy control for access to groups; (5) group session handling; (6) access control; (7) do-not-disturb functionality; (8) floor control functionality (floor control is a control mechanism that arbitrates requests, from the UEs, for the right to speak); (9) talker identification; (10) participant information; (10) quality feedback; (11) charging reports; and (12) media distribution. Presence server 310 manages presence information that is uploaded by presence user/network/external agents, and is responsible for combining the presence-related information for a certain presentity from the information it receives from multiple sources into a single presence document.

An Is interface supports the communication between UE 302 and IMS core 312. This communication includes SIP procedures which support the PoC features. The protocol for the Is interface is Session Initiation Protocol (SIP). Is signaling is transported on User Datagram Protocol (UDP). The protocols over an If interface support the communication between IMS core 312 and PoC server 304 for session control. The protocols over an It interface support the transport of talk bursts, floor control, and link quality messages between UE 302 and PoC Server 304. The protocols over an Im interface support the communication between UE 302 and GLMS 308 for the purpose of managing the groups, contact lists and access lists and Do-not-Disturb indication. HTTP/XML protocols are utilized for these purposes. The protocols over an Ik interface support the communication between PoC Server 304 and GLMS 308, enabling PoC server 304 to retrieve the groups and access lists from GLMS 308. The protocols over an Ips interface enable the uploading of the registration status from IMS core 312 to presence server 310 and the dissemination of the presence information between presence server 310 and UE 302. The protocol over an Ipl interface enables the uploading of Do-not-Disturb status and granted/blocked access lists from GLMS 308 to presence server 310. The group identity used on the Is interface between the UE and IMS core for group talk is generated by GLMS 308.

Each entity in the PoC system is assigned one or more IP addresses belonging to public or private IP realms. On the other hand, an end user may address another user by a phone number. UE 302 sends a phone number to IMS core 312 in a TEL Uniform Resource Locator (URL). The phone number may use the international E.164 format (prefixed with a '+' sign) or a local format using a local dialing plan and prefix. IMS core 312 interprets the phone number with a leading '+' to be an E.164 number. Addressing by TEL URL for a PoC session requires that PoC Server 304 can resolve the TEL URL to a SIP URI, for instance by using DNS/ENUM or other local data base. A phone number in a local format is converted to the E.164 format before DNS/ENUM is used.

End users may initiate PoC talk sessions. An INVITE request on the Is interface contains an "Accept-Contact" header with a media feature tag indicating the PoC service. IMS core 312 is able to identify the request as a PoC communication by inspecting the Accept-Contact header. A Request-URI of the INVITE contains either the pre-configured ad-hoc identity (for instant personal talk and ad-hoc instant group) or a group identity (for instant group talk or chat group talk). Early session establishment is used for having a session available for quick connection establishment using "REFER". The early session establishment's INVITE does not have any referred party field and can be differentiated from this against other INVITEs. A transient group identity is generated by PoC server 304 and distributed to UE 302 in the "Contact" header. From an initiating UE 302, the public user identity of the inviting user is included in the "From" header. On the signaling towards the invited user, the "From" header includes either the public user identity (instant personal talk, ad-hoc instant group) or the group identity (instant group talk or being added to a chat group).

Other than the inventive techniques described herein, the PoC architecture and signaling may be the same as is conventional as described in current standard specifications such as Push-to-talk over Cellular (PoC), Architecture, PoC Release 1.0—Architecture V1.1.0 (2003-08) Technical Specification; and Push-to-talk over Cellular (PoC), Signaling Flows, PoC Release 1.0—Signaling Flows V1.1.3 (2003-08) Technical Specification. In addition, although the PoC architecture and signaling has been provided as the exemplary environment for the techniques of the present application, any suitable network for PTT voice communications may be utilized.

Figure 4:
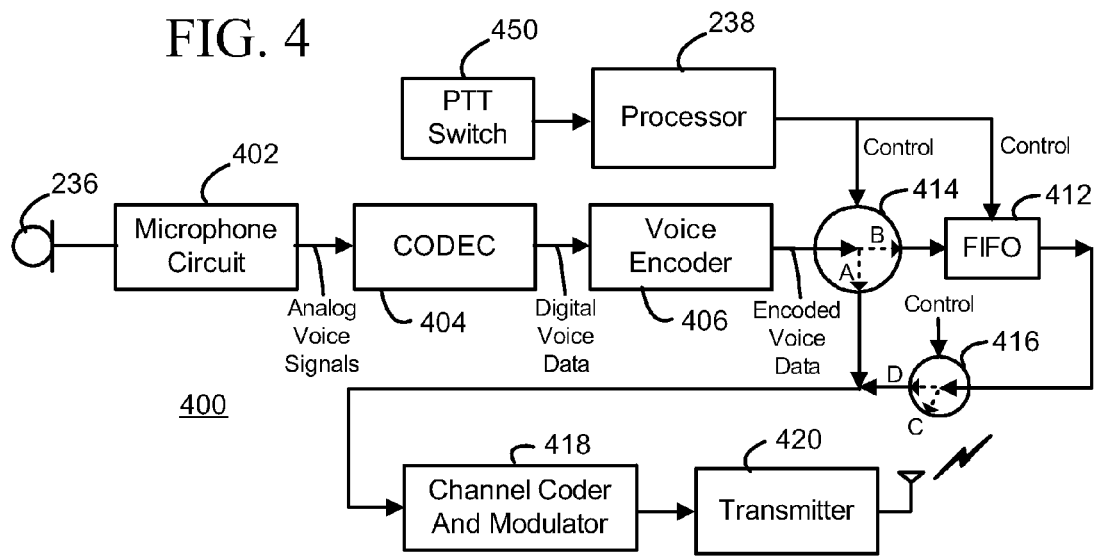
FIG. 4 is a schematic block diagram of pertinent electrical components for the immediate receipt and queuing of voice data for PTT communications in the mobile station of FIGS. 1-2.

FIG. 4 is a schematic block diagram of pertinent electrical components 400 for the immediate receipt and queuing of voice data for PTT communications for the mobile station of FIGS. 1-2. The schematic block diagram of FIG. 4 includes microphone 236, a microphone circuit 402, a coder/decoder (CODEC) 404, a voice encoder 406 for voice compression, a switch 414, a first-in-first-out (FIFO) buffer memory 412, a switch 416, a channel coder and modulator 418, a transmitter 420 (including transmitter PA), a PTT communication switch 450, and microprocessor 238.

Microphone 236 has an output coupled to microphone circuit 402 which includes circuitry for biasing and filtering analog voice signals from microphone 236 and for controlling the on/off state of microphone 236. An output of microphone circuit 402 is coupled to an input of CODEC 404, which may include conventional voice processing circuits such as one or more amplifiers, one or more filters, an automatic gain control (AGC) circuit, and an analog-to-digital (A/D) converter, and optionally a nonlinear compender such as an A-law compender. Thus, CODEC 404 converts the analog voice signals into digital voice data and has an output that provides the digital voice data. In particular, the signal may be a pulse-coded modulated (PCM) signal. The output from CODEC 404 is coupled to an input of voice encoder 406, which is an encoder that operates to compress and reduce the data rate of the PCM voice data for transmission without an unacceptable degradation of voice quality at the receiving end. An output of voice encoder 406, which provides the encoded voice data, is coupled to an input of switch 414. Note that the date rate at the output of voice encoder 406 (e.g. 8 kbps) is substantially lower than the data rate at the output of CODEC 404 (e.g. 64 kbps).

A first output of switch 414 is coupled to an input of FIFO buffer memory 412, and a second output of switch 414 is coupled to an input of channel coder and modulator 418. An output of FIFO buffer memory 412 is also coupled to the input of channel coder and modulator 418 through switch 416. Channel coder and modulator 418 provide for forward error correcting and/or error detecting, and transforming the signal into a form that is suitable for transmission over the radio frequency (RF) channel. For example, channel coder and modulator 418 may be a combination of a convolutional encoder, a spread spectrum spreader, and a QPSK modulator. Transmitter 420, which includes at least a frequency upconverter and a power amplifier (PA) (not shown in FIG. 4), is coupled to the antenna for the transmission of voice data to the wireless network.

Processor 238 has an output which controls the position of switches 414 and 416. Depending on the switch position, switch 414 will route encoded voice data from encoder 406 to either channel coder and modulator 418 for transmission to the wireless network (switch position "A"), or to FIFO buffer memory 412 for storage of the encoded voice data (switch position "B"). Processor 238 controls switch 414 to be in switch position B when buffering in accordance with the present application is needed for PTT voice communications; otherwise the processor controls switch 414 to be in switch position A for ordinary voice communications (e.g. cellular telephone voice calls). Processor 238 controls switch 416 to be in a switch position "D" when buffered voice data for PTT voice communications is being transmitted to the wireless network in accordance with the present application; otherwise the processor controls switch 416 to be in a switch position "C" for normal voice communications (e.g. cellular telephone voice calls).

In an alternative configuration, voice encoder 406 of FIG. 4 is relocated in the circuit and coupled directly in line with channel coder and modulator 418 (after the paths of switches 414 and 416), such that the output of CODEC 404 is coupled directly to the input of switch 414. This alternative is workable, albeit slightly less desirable as a larger amount of memory space would be required for FIFO buffer memory 412.

Figure 5:
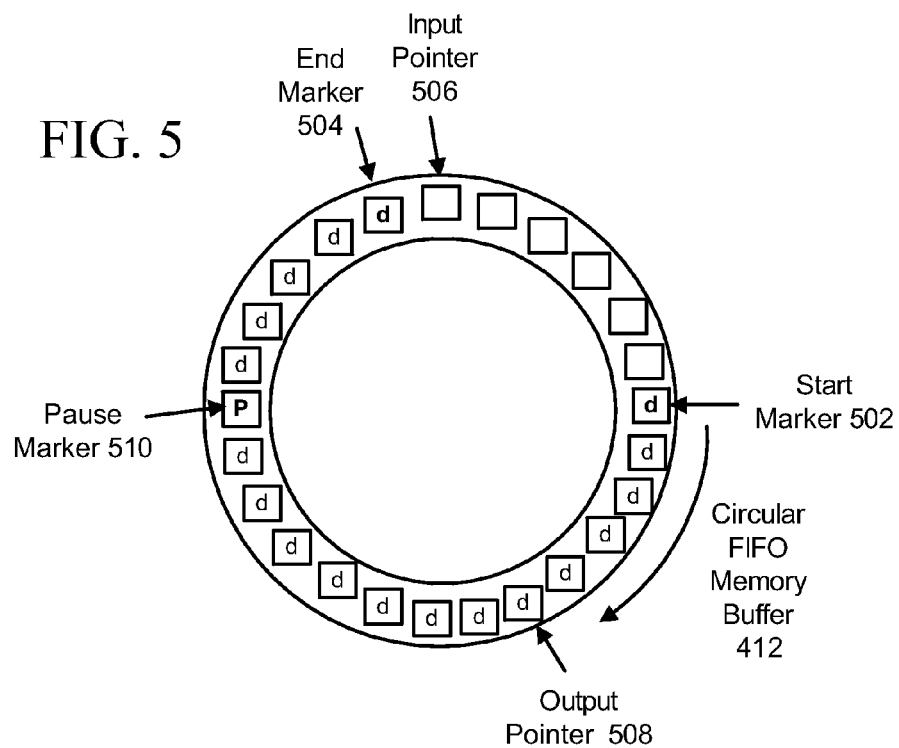
FIG. 5 is an illustrative representation of a first-in-first-out (FIFO) buffer memory of the schematic block diagram of FIG. 4.

FIG. 5 is an illustrative representation of FIFO buffer memory 412 of the schematic block diagram of FIG. 4. FIFO buffer memory 412 may be any suitable memory that alone, or in combination with other circuitry, permits reconstruction of recorded voice data in its proper order. As illustrated, FIFO buffer memory 412 which stores voice data is a circular buffer memory. Each square in FIG. 5 represents a separate memory location or block which is separately addressable. Using circular buffering, voice data is saved in a consecutive fashion in FIFO buffer memory 412 such that older voice data is written over by newer voice data in a loop-type fashion. The size of FIFO buffer memory 412 is sufficient to buffer an amount of voice data based on the data rate and the time delay period for PTT setup. For example, given a worst case delay time period of 8 seconds for a PTT setup and a maximum data rate of 8 kilobits per second (kbps), FIFO buffer memory 412 has a minimum size of about 64 kbits.

A pair of start and end markers 502 and 504 for FIFO buffer memory 412 typically define the boundaries of a single previously-saved PTT voice communication for transmission from the mobile station. Start marker 502 is used to identify a beginning of the PTT voice communication, and an end marker 504 is used to identify the end of the PTT voice communication. Start and end markers 502 and 504 may be in the form of address pointers stored in another portion of memory which "point" to the appropriate location in FIFO buffer memory. Thus, start marker 502 is a pointer address corresponding to a memory location of the beginning of the PTT voice communication, and end marker 504 is a pointer address corresponding to a memory location of an end of the PTT voice communication.

Also in FIG. 5, an input pointer 506 to FIFO buffer memory 412 identifies a next available memory location for saving voice data for a PTT voice communication. On the other hand, an output pointer 508 identifies the next available memory location corresponding to the voice data of the PTT voice communication to be processed and transmitted from the mobile station. Input and output pointers 506 and 508 may be stored in another portion of memory to "point" to the appropriate location within FIFO buffer memory 412. When voice data is being input and output from FIFO buffer memory 412, input and output pointers 506 and 508 are incremented (or decremented) accordingly to appropriately read in and write out the voice data. Note that a pause marker 510 is used to provide pausing or "silent" voice data between separate PTT voice communications under certain conditions, as will be described later below.

According to the general method of the present application, the components of FIGS. 4-5 are used such that voice data corresponding to voice signals are accepted from the microphone and queued in the FIFO buffer memory immediately after a PTT switch actuation. Thus, the end user does not need to wait any substantial delay period to talk after PTT switch actuation. Voice data is continuously received and stored in the FIFO buffer memory and, when PTT setup procedures are complete, the saved voice data is suitably output from the FIFO and transmitted to the wireless network. During the transmission of FIFO voice data, new voice data corresponding to new voice signals are continuously received and stored in the FIFO to replace (i.e. rewrite over) used voice data in the FIFO.

Figure 6:
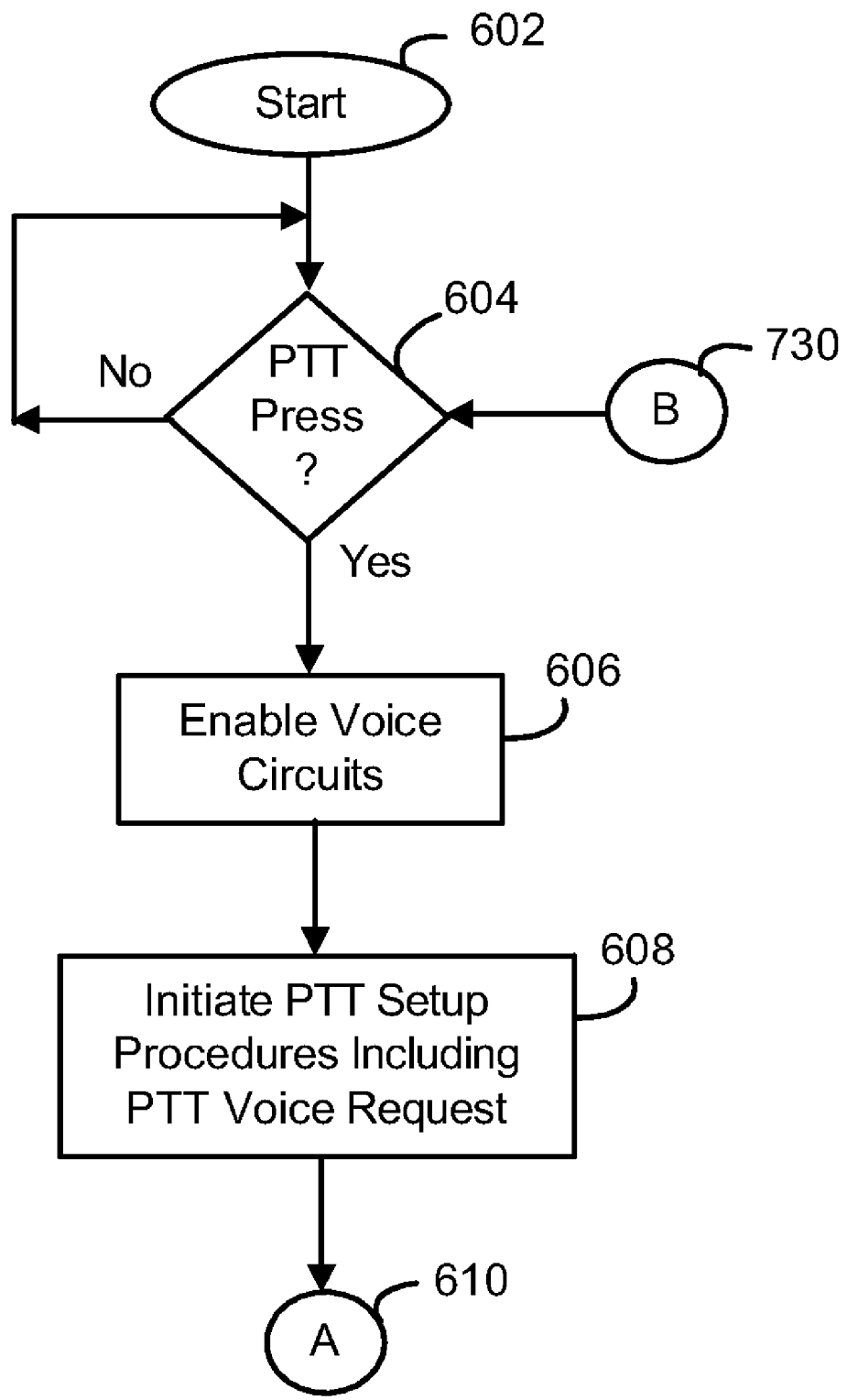
FIGS. 6-7 form a flowchart relating to a method for use in a mobile station for the immediate receipt and queuing of voice data for PTT voice communications.
Figure 7:
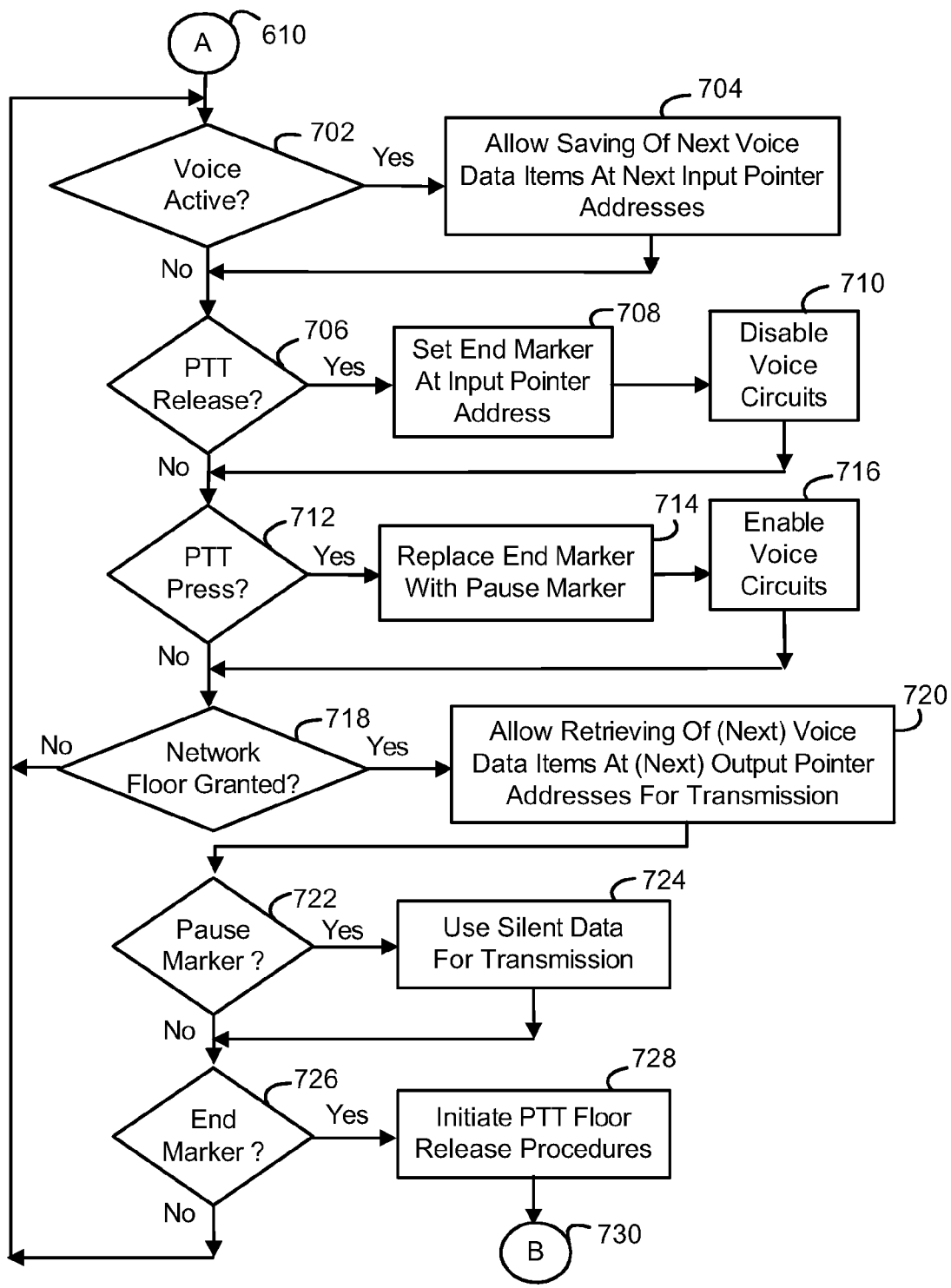

FIGS. 6-7 form a flowchart which describes a more detailed method for the immediate receipt and queuing of voice data for PTT voice communications in accordance with the present application. This method is performed by a mobile station within the context described above in relation to FIGS. 1-5. In addition, the method may be embodied in a computer program product which includes a storage medium (e.g. computer disk or memory) and computer instructions stored in the storage medium. These computer instructions are performed by one or more processors of the mobile station (e.g. microprocessor, DSP, etc.). In the description that follows, the flowchart of FIG. 6 will be described in combination with the components of FIGS. 4-5.

Beginning at a start block 602 of FIG. 6, a processor of the mobile station detects whether a PTT switch has been depressed by the end user (step 604 of FIG. 6). If not, the processor continues to monitor for switch actuations. If the PTT switch has been depressed at step 604, the processor causes voice circuits of the mobile station to be enabled (step 606 of FIG. 6), assuming they are disabled. Referring to FIG. 4, the enabling of step 606 may include the enabling of microphone circuit 402, CODEC 404, encoder 406, and FIFO buffer memory 412 of FIG. 4. Switch 414 of FIG. 4 is set to the position B so that voice data from the output of encoder 406 may be routed to FIFO buffer memory 412 (and not directly to channel coder and modulator 408). The processor initiates the saving of voice data items of received voice signals from the microphone in the FIFO buffer memory, beginning at a start marker which is set at a location in the memory (for example, see start marker 502 of FIG. 5). Thus, switch 414 is positioned so that encoded voice data corresponding to voice input signals from microphone 402 can be accepted and queued in FIFO buffer memory 412 immediately after actuation of PTT switch 450, without regard to PTT setup procedures delays.

Next, the processor causes PTT setup procedures to be initiated such that a PTT voice communication may be made by the end user (step 608 of FIG. 6). The PTT setup procedures include accessing the network, establishing a traffic channel, and sending a PTT voice communication request through the wireless communication network. Ordinarily, in response to the PTT setup procedures, a permission is granted for the PTT voice communication. These procedures normally take some amount of time to complete. For example, in some networks it may take a few seconds to receive permission or acceptance from the network and establish the channel for PTT voice communication with the network. The flowchart of FIG. 6 is continued through a connector A 610 to FIG. 7.

Note that, although the following steps in FIG. 7 are described as being performed sequentially in the flowchart, functions may be performed independently and as parallel processes, such as the recording of data in and reading of data from the memory. From the connector A 610 of FIG. 7, the processor identifies whether voice signals of a PTT voice communication are being received at the user interface of the mobile station (step 702 of FIG. 7). Step 702 may be performed by checking whether the voice circuits are enabled (i.e. if enabled, then voice signals are being received), whether the actuation state of the PTT switch is depressed (i.e. if in depressed state, then voice signals are being received), or testing a bit flag, as examples. If voice signals of the PTT voice communication are being received at the user interface at step 702, then the processor allows saving of the next voice data items of the received voice signals from the microphone in the FIFO buffer memory at the next input pointer addresses (step 704 of FIG. 7). Preferably, encoded voice data items from the voice encoder are stored in the FIFO buffer memory to conserve memory space.

The processor then identifies whether a PTT release has been detected at the user interface (step 706 of FIG. 7). If the PTT release is detected at step 706, then the processor causes an end marker which points to the current input pointer address to be saved (step 708 of FIG. 7). In combination with the start marker, the end marker defines the boundaries of the voice data for the PTT voice communication. See start and end markers 502 and 504 of FIG. 5. Next, the processor causes at least some of the voice circuits to be disabled (step 710 of FIG. 7). This may include disabling of microphone circuit 402, CODEC 404, and encoder 406. Note that PTT release procedures are not yet initiated, but rather suspended by the mobile station, as buffered voice data of the PTT voice communication still exists in FIFO buffer memory 412 for transmission.

The processor then identifies whether a new PTT press has been detected at the user interface (step 712 of FIG. 7). Such a PTT press may occur some time after a PTT release has been detected, but before all of the buffered voice data of the PTT voice communication has been transmitted. Such PTT press detection will not occur unless a PTT release has previously been detected at step 706 and an end marker has been set. If the PTT press is detected at step 712, then the processor causes the end marker (previously set in response to a detected PTT release) to be replaced with a pause marker (step 714 of FIG. 7). The processor also causes the voice circuits to be enabled (step 716 of FIG. 7) as the end user has chosen to continue talking from the new PTT press.

Next, the processor identifies whether a floor grant for the PTT voice communication has been received or previously received from the wireless network (step 718 of FIG. 7). If not, then the processor does not yet cause any of the stored voice data to be transmitted from the mobile station and the method repeats starting again with step 702. If a floor grant has been granted, the processor allows the retrieving of the (next) voice data items of the PTT voice communication at the (next) output pointer addresses from the FIFO buffer memory for transmission (step 720 of FIG. 7). In FIG. 5, the transmission of the next voice data items to the wireless network occurs from an output of FIFO buffer memory 412 through switch 416, channel coder and modulator 418, transmitter 420, and the antenna.

Continuing with FIG. 7, the processor then identifies whether a pause marker is contained at the current output pointer address of the FIFO buffer memory (step 722 of FIG. 7). If a pause marker is encountered, this means that the end user had previously released the PTT switch and re-pressed it shortly thereafter (before completion of PTT release procedures) to talk further. See pause marker 510 of FIG. 5. If a pause marker is identified at step 722, the processor causes a pause or "silent data" to be inserted into the PTT voice transmission. This serves to simulate an actual pause time that occurred between the first PTT voice communication and the second or follow-up PTT voice communication by the end user. Any suitable technique over any suitable timeframe may be used to provide this pause simulation. For example, silent voice data corresponding to a relatively short time period may be stored in memory and output into the data stream.

The processor then identifies whether an end marker is contained at the current output pointer address of the FIFO buffer memory (step 726 of FIG. 7). If an end marker is encountered, this signifies the end of the PTT voice transmission which occurs some time after release of the PTT switch by the end user. As stated earlier, the end marker in combination with the start marker defines the boundaries of the voice data for the PTT voice communication. See start and end markers 502 and 504 of FIG. 5. In response to identifying the end marker at step 726, the processor initiates PTT floor release procedures with the wireless network (step 728 of FIG. 7). The method continues through a connector B 730 back to FIG. 6.

Thus, voice data corresponding to voice signals are accepted from the microphone and queued in FIFO buffer memory immediately after a PTT switch actuation. Thus, the end user does not need to wait for any delay period to talk after PTT switch actuation. Voice data is continuously received and stored in the FIFO buffer memory and, when PTT setup procedures are complete, the voice data is output from the FIFO and transmitted. During the transmission of FIFO voice data, new voice data corresponding to new voice signals are continuously received and stored in the FIFO to replace the old voice data, during the continuous transmission of previously stored voice data. Preferably, encoded voice data is stored in the FIFO buffer memory to conserve memory space. Note that special cases are also handled with the present buffering techniques, where the end user presses the PTT switch soon after its release during voice data transmission. Here, the insertion of pauses between separate PTT voice communications helps simulate the actual voice communications made by the end user, and the radio channel stays active during the short voice gap without being released and reestablished. The process of handling short releases of the PTT switch may occur one or more times during a single PTT radio transmission.

Note that a delay time period still exists between the user actuation of the PTT switch and the network floor grant—but the saving of the digital voice data in the FIFO buffer memory is performed at least in part during the delay time period. Put another way, at least some of the saving of the digital voice data is performed prior to identifying the network floor grant. Thus, a delay time period between the user actuation of the PTT switch and the receipt of voice input signals from the microphone is zero or nearly zero.

Final Comments. As described herein, methods and apparatus for the immediate acceptance and queuing of voice data for PTT voice communications are useful for reducing PTT talk delay. In one illustrative example, a mobile station includes a wireless transceiver; a user interface including a Push-To-Talk (PTT) switch for initiating a PTT voice communication and a microphone for receiving voice input signals; one or more processors; and a First-In-First-Out (FIFO) buffer memory coupled to the one or more processors. The one or more processors are operative to identify a user actuation of the PTT switch and, in response, save digital voice data corresponding to voice input signals in the FIFO buffer memory; cause a request for the PTT voice communication to be made through a wireless network; identify that a floor grant has been received through the wireless network in response to the request; and after identifying the floor grant, cause the digital voice data from the FIFO buffer memory to be transmitted to the wireless network for the PTT voice communication.

The circuitry may include a coder/decoder (CODEC) having an input coupled to the microphone; a voice encoder having an input coupled to an output of the CODEC; the FIFO buffer memory having an input for coupling to an output of the CODEC; a switch coupled between the output of the voice encoder and an input to the FIFO buffer memory; where the one or more processors are operative to control the switch so as to route the encoded voice data to the input to the FIFO buffer memory for the PTT voice communication. Alternatively, the circuitry may include a CODEC having an input coupled to the microphone and an output which provides for voice data; the FIFO buffer memory having an input for receiving the voice data from the CODEC; a switch coupled between the output of the CODEC and the input to the FIFO buffer memory; where the one or more processors are operative to control the switch so as to route the voice data to the input to the FIFO buffer memory for the PTT voice communication.

A wireless communication system of the present application includes a wireless communication network; a Push-to-talk (PTT) over Cellular (PoC) server coupled in the wireless network; and one or more mobile stations which operate in the wireless communication network. Each mobile station includes a wireless transceiver which communicates through the wireless communication network; a user interface which includes a Push-To-Talk (PTT) switch for initiating a PTT voice communication via the PoC server and a microphone for receiving voice input signals; one or more processors; and a First-In-First-Out (FIFO) buffer memory coupled to the one or more processors. The one or more processors are operative to identify a user actuation of the PTT switch and, in response to identifying the user actuation of the PTT switch, cause a request for the PTT voice communication to be made through the wireless network; save, in the FIFO buffer memory, digital voice data corresponding to voice input signals received at the microphone; identify that a floor grant has been received through the wireless network in response to the request; and after identifying the floor grant, cause the digital voice data from the FIFO buffer memory to be retrieved and transmitted to the wireless network for the PTT voice communication.

A method of the present application for use in Push-To-Talk (PTT) voice communications for a mobile station includes the steps of identifying a user actuation of a PTT switch for initiating a PTT voice communication through a wireless communication network and in response to identifying the user actuation of the PTT switch: causing a request for the PTT voice communication to be made through the wireless network; saving, in a First In First Out (FIFO) buffer memory, digital voice data corresponding to voice input signals; identifying that a floor grant has been received through the wireless network in response to the request; and after identifying the floor grant, causing the digital voice data from the FIFO buffer memory to be retrieved and transmitted to the wireless network for the PTT voice communication. A computer program product of the present application includes a storage medium; computer instructions stored in the storage medium; where the computer instructions are executable by one or more processors for performing the method previously described.

The above-described embodiments of the present application are intended to be examples only. Those of skill in the art may effect alterations, modifications and variations to the particular embodiments without departing from the scope of the application. The invention described herein in the recited claims intends to cover and embrace all suitable changes in technology.

What is claimed is:

1. A method in a Push-To-Talk (PTT) capable mobile station, the method comprising:
   sending a PTT voice communication request in a wireless communication network;
   prior to receiving a floor grant in response to the PTT voice communication request: beginning to receive voice input signals at the mobile station and encode, voice compress, and save digital voice data corresponding to the voice input signals in memory of the mobile station;
   receiving the floor grant in response to the PTT voice communication request;
   upon receiving the floor grant: retrieving the saved digital voice data from the memory and transmitting the retrieved digital voice data; and
   continuing to save the digital voice data in the memory after receiving the floor grant.

2. The method of claim 1, further comprising:
   continuing to save the digital voice data while transmitting the retrieved digital voice data.

3. The method of claim 1, wherein the act of encoding comprises the further act of encoding with use of a coder/decoder (CODEC).

4. The method of claim 1, wherein the act of voice compressing comprises the further act of compressing with use of a voice compressor.

5. A Push-To-Talk (PTT) capable mobile station, comprising:
   a processor configured to generate a PTT voice communication request;
   a transmitter coupled to the processor, the transmitter configured to send the PTT voice communication request in a wireless communication network; and
   memory coupled to the processor; and
   a receiver coupled to the processor, the receiver configured to receive a floor grant in response to the transmission of the PTT voice communication request;

wherein the processor is further configured to:
  upon transmission of the PTT voice communication request: begin receiving voice input signals at the mobile station, and encoding, voice compressing, and saving in the memory digital voice data corresponding to the voice input signals;
  upon the reception of the floor grant: retrieve the saved digital voice data from the memory and cause the transmitter to transmit the retrieved digital voice data; and
  continue saving in the memory the digital voice data corresponding to voice input signals after the reception of the floor grant in response to the transmission of the PTT voice communication request.

6. The PTT capable mobile station of claim 5, wherein the processor is further configured to continue saving the digital voice data in the memory during the transmission of the retrieved digital voice data.

7. The PTT capable mobile station of claim 5, wherein the processor is configured to encode the voice input signals with use of a coder/decoder (CODEC).

8. The PTT capable mobile station of claim 5, wherein the processor is configured to voice compress the encoded digital data with use of a voice compressor.

* * * * *